United States Patent
Frances

(10) Patent No.: US 7,041,710 B2
(45) Date of Patent: *May 9, 2006

(54) COMPOSITIONS BASED ON FUNCTIONALISED RADIATION-CURABLE SILICONES AND ANTI-ADHESIVE COATINGS OBTAINED FROM SAID COMPOSITIONS

(75) Inventor: Jean-Marc Frances, Meyzieu (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/432,275

(22) PCT Filed: Nov. 20, 2001

(86) PCT No.: PCT/FR01/03629

§ 371 (c)(1),
(2), (4) Date: May 19, 2003

(87) PCT Pub. No.: WO02/42388

PCT Pub. Date: May 30, 2002

(65) Prior Publication Data

US 2004/0110860 A1 Jun. 10, 2004

(30) Foreign Application Priority Data

Nov. 21, 2000 (FR) .................................. 00 15016

(51) Int. Cl.
*C08L 83/00* (2006.01)

(52) U.S. Cl. ............................ 522/99; 522/31; 522/49; 522/67; 525/477

(58) Field of Classification Search ................ 428/447, 428/448; 522/31, 39, 64, 65, 66, 170, 99, 522/169; 525/477, 478, 476
See application file for complete search history.

(56) References Cited

U.S. PATENT DOCUMENTS

| | | | |
|---|---|---|---|
| 5,340,898 A | | 8/1994 | Cavezzan |
| 5,594,042 A | * | 1/1997 | Glover et al. .................. 522/31 |
| 5,866,261 A | * | 2/1999 | Kerr et al. .................... 428/447 |
| 5,973,020 A | * | 10/1999 | Kerr et al. .................... 522/25 |
| 6,187,834 B1 | * | 2/2001 | Thayer et al. ................. 522/15 |

FOREIGN PATENT DOCUMENTS

| | | |
|---|---|---|
| EP | 1 010 727 | 6/2000 |
| FR | 2 731 007 | 8/1996 |
| WO | WO 93/08238 | 4/1993 |
| WO | WO 93/20163 | 10/1993 |
| WO | WO 96 05962 | 2/1996 |

* cited by examiner

Primary Examiner—Marc S. Zimmer

(57) ABSTRACT

The invention concerns a radiation-curable silicone coating, comprising (a) at least a liquid polyorganosiloxane having a viscosity of about 10 to 10000 mPa's at 25° C. and bearing a crosslinkable/polymerisable function Fa on at least a M and/or T unit, and/or at least a crosslinkable/polymerisable function on at least a D unit; (b) at least a liquid linear polyorganosiloxane B having a viscosity of about 10 to 10000 mPa's at 25° C. and bearing two crosslinkable/polymerisable functions Fb on at least a M unit; (c) a cationic photoinitiator of onium borate type.

11 Claims, No Drawings

COMPOSITIONS BASED ON FUNCTIONALISED RADIATION-CURABLE SILICONES AND ANTI-ADHESIVE COATINGS OBTAINED FROM SAID COMPOSITIONS

This application is an application under 35 U.S.C. Section 371 of International Application Number PCT/FR01/03629 filed on Nov. 20, 2001.

The present invention relates to novel silicone compositions which can be cured under UV irradiation and/or an electron beam. More specifically, a subject matter of the invention is novel compositions for coatings based on a mixture of polyorganosiloxanes A carrying functional groups on D and T units and of polyorganosiloxanes B carrying functional groups on M units; these functional groups being crosslinkable and/or polymerizable under UV irradiation or an electron beam. These mixtures are effectively crosslinked and/or polymerized under irradiation in the presence of compatible cationic photoinitiators and are particularly suited for their use in the field of release-paper supports.

It is known to use curable silicone compositions to render surfaces nonadhesive with respect to materials which normally would adhere to the latter. At the present time, it is known to use cationic photocrosslinkable and/or photopolymerizable compositions to obtain coatings with release properties composed of silicone oils or resins functionalized with epoxide, alkenyl ether or oxetane functional groups or the like.

Release coatings are of use in numerous applications where it is necessary to render nonadhesive with regard to other materials a surface or a material which normally would adhere to them.

For example, silicone compositions are used as coatings for release papers and can thus be combined with adhesive components which can be easily released without losing their adhesive properties, it being possible for these components to be pressure-sensitive adhesives for labels, decorative laminates, transfer tape, and the like.

Silicone-based release coatings applied to paper, polyethylene, polypropylene, polyester and other supports of this type are also of use as release surfaces for applications in the handling of food and in industrial packaging. For example, when a label is coated with an adhesive and combined with a nonadhesive support, it is desirable for the label to be easily separated when it is used, without its quality of adhesion being diminished by the fact that it has been separated from the support. The same principle applies with certain tapes exhibiting a nonadhesive side and an adhesive side and which are supplied on reels. This is because it is necessary for the tape to easily unroll and to retain its characteristics of adhesion of the adhesive side after a long storage time and optionally a high pressure between the adhesive side and the release side, in particular insofar as these reels can sometimes achieve a diameter of more than a meter. Attempts are made to obtain these results by coating the nonadhesive support or the nonadhesive side of the tape with a silicone-based release composition which will subsequently come into reversible contact with the adhesive.

It thus appears to be necessary for silicone-based nonstick coatings, when combined with adhesives, to confer on these combinations, known as silicone-adhesive complexes, a low disbandment force which is stable over time and whatever the pressure exerted between the release coating and the adhesive while also providing the latter with unchanging adhesion properties.

Furthermore, the release coatings have to fulfill other conditions as best possible and in particular they have to rapidly cure and the photoinitiator has to be selected in order to be miscible with the silicones of the composition.

It is precisely these objectives which are achieved and optimized according to the present invention. This is because the silicone compositions developed are specifically adapted for the preparation of release coatings and confer on the silicone/adhesive complexes a low disbandment force; this disbandment force being stable on storage over time and stable whatever the pressure exerted between the release coating and the adhesive. Other advantages will emerge on reading the description.

Thus, a subject matter of the present invention is a crosslinkable and/or polymerizable composition for an irradiation-curable silicone-based release coating, characterized in that it comprises:

(a) at least one liquid polyorganosiloxane A having a viscosity of approximately 10 to 10 000 mPa·s at 25° C. and carrying a crosslinkable and/or polymerizable functional group Fa on at least one M and/or T unit and/or at least one crosslinkable and/or polymerizable functional group Fa on at least one D unit, (b) at least one liquid polyorganosiloxane B having a viscosity of approximately 10 to 10 000 mPa·s at 25° C. and carrying at least 2 crosslinkable and/or polymerizable functional groups Fb on at least one M unit, (c) and an effective amount of a cationic photoinitiator composed of at least one onium borate.

Irradiation is generally carried out under UV radiation and/or under an electron beam. For the UV radiation, a wavelength of between 200 and 400 nanometers, preferably between 230 and 360 nanometers, is used. The irradiation time can be short, that is to say less than 1 second and of the order of a few hundredths of a second for thin coatings. The curing time is adjusted (a) by the number of UV lamps used, (b) by the duration of exposure to UV radiation and/or (c) by the distance between the composition and UV lamp. For the electron beam, mention will be made, as examples of devices which can be used, of those with a beam of pulsed electrons (Scanned Electron Beam Accelerator) and those with a beam of electrons as a curtain (Electron Curtain Accelerator).

For the silicone A, the crosslinkable and/or polymerizable functional groups Fa are chosen from the group consisting of epoxy and/or alkenyl ether and/or oxetane and/or dioxolane functional groups. Preferably, the Fa functional group is a functional group of epoxy type.

In the context of the invention, the polyorganosiloxane A used is linear and composed of units D(i) of formula (I) and terminated by units M(ii) of formula (II) or is cyclic and composed of units D(i) of formula (I), which formulae are represented below:

in which:
(1) the symbols R, which are alike or different, represent:
   (i) a linear or branched alkyl radical comprising 1 to 8 carbon atoms which is optionally substituted by at least one halogen, preferably fluorine, the alkyl radicals preferably being methyl, ethyl, propyl, octyl and 3,3,3-trifluoropropyl,
   (ii) an optionally substituted cycloalkyl radical comprising between 5 and 8 cyclic carbon atoms,
   (iii) an aryl radical comprising between 6 and 12 carbon atoms which can be substituted, preferably phenyl or dichlorophenyl,
   (iv) an aralkyl part having an alkyl part comprising between 5 and 14 carbon atoms and an aryl part comprising between 6 and 12 carbon atoms which is optionally substituted on the aryl part by halogens, alkyls and/or alkoxyls comprising 1 to 3 carbon atoms,
   (v) a hydroxyl group OH or an alkoxyl group comprising from 1 to 8 carbon atoms,
   (vi) a hydrogen radical,
(2) the symbols X are alike or different and represent:
   (i) a group R,
   (ii) and/or a crosslinkable and/or polymerizable organofunctional group Fa, preferably an epoxy functional, oxetane functional, dioxolane functional and/or alkenyl ether functional group, connected to the silicon of the polyorganosiloxane via a divalent radical which comprises from 2 to 20 carbon atoms and which can comprise at least one heteroatom, preferably oxygen,
   (iii) with at least one of the symbols Fa in one of the units (I).

Preferably, the symbols R correspond to the definitions (1)(i) to (1)(iv) given above.

The linear polyorganosiloxanes A can be oils with a dynamic viscosity at 25° C. of the order of 10 to 10 000 mPa·s at 25° C. (measured using a Brookfield viscometer, according to the AFNOR NFT 76 102 standard of February 1972), generally of the order of 20 to 5 000 mPa·s at 25° C. and more preferably still of 20 to 600 mPa·s at 25° C., or gums exhibiting a molecular mass of the order of 1 000 000.

When the polyorganosiloxanes A are cyclic, they are composed of units (I) which can, for example, be of the dialkylsiloxy, alkylarylsiloxy, (alkyl)(Fa group)siloxy or (aryl)(Fa group)siloxy type. These cyclic polyorganosiloxanes exhibit a viscosity of the order of 1 to 5 000 mPa·s.

For the silicone B, the crosslinkable and/or polymerizable functional groups Fb are chosen from the group consisting of the epoxy and/or alkenyl ether and/or oxetane and/or dioxolane functional groups. Preferably, the Fb functional group is a functional group of epoxy type.

In the context of the invention, the polyorganosiloxane B is linear and composed of units D(iii) of formula (III) and terminated by units M(iv) of formula (IV), which formulae are represented below:

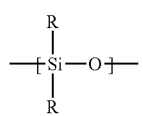

(III)

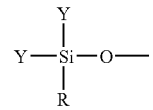

(IV)

in which:
(1') the symbols R, which are alike or different, represent:
   (i) a linear or branched alkyl radical comprising 1 to 8 carbon atoms which is optionally substituted by at least one halogen, preferably fluorine, the alkyl radicals preferably being methyl, ethyl, propyl, octyl and 3,3,3-trifluoropropyl,
   (ii) an optionally substituted cycloalkyl radical comprising between 5 and 8 cyclic carbon atoms,
   (iii) an aryl radical comprising between 6 and 12 carbon atoms which can be substituted, preferably phenyl or dichlorophenyl,
   (iv) an aralkyl part having an alkyl part comprising between 5 and 14 carbon atoms and an aryl part comprising between 6 and 12 carbon atoms which is optionally substituted on the aryl part by halogens, alkyls and/or alkoxyls comprising 1 to 3 carbon atoms,
   (v) a hydroxyl group OH or an alkoxyl group comprising from 1 to 8 carbon atoms,
(vi) and a hydrogen radical,
(2') the symbols Y are alike or different and represent:
   (i) a group R,
   (ii) and/or a crosslinkable and/or polymerizable organofunctional group Go, preferably an epoxy functional, oxetane functional, dioxolane functional and/or alkenyl ether functional group, connected to the silicon of the polyorganosiloxane via a divalent radical which comprises from 2 to 20 carbon atoms and which can comprise at least one heteroatom, preferably oxygen,
   (iii) with at least one of the symbols Fb and preferably two symbols Fb in one of the units (IV).

Preferably, the symbols R correspond to the definitions (1')(i) to (1')(iv) given above.

According to a first advantageous alternative form of the present invention, the polyorganosiloxane B carries at least 2 units M with at least 2 functional groups Fb.

According to a second advantageous alternative form of the present invention, the polyorganosiloxane B additionally carries at least one functional group Fb on at least one unit D of formula:

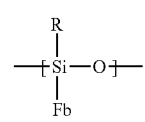

in which Fb and R have definitions identical to those given above.

According to an advantageous alternative form of the invention, the polyorganosiloxanes B used comprise less than 1 000 units D(iii), preferably from 10 to 500 units D(iii) and more particularly from 20 to 300 units D(iii).

According to an advantageous alternative form of the invention, the polyorganosiloxanes B used comprise 4 to 10 organofunctional groups per macromolecular chain.

The linear polyorganosiloxanes B are generally oils with a dynamic viscosity of the order of 10 to 10 000 mPa·s at 25° C., preferably of the order of 20 to 5 000 mPa·s at 25° C. and more particularly still of 20 to 600 mPa·s at 25° C.

The reactive functional groups Fa and Fb can have highly varied structures. Mention may be made, as examples of divalent radicals connecting a functional group Fa or Fb of the epoxy and/or oxetane type, of those included in the following formulae:

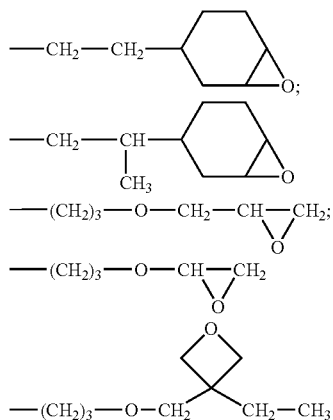

As regards the functional groups Fa or Fb of the alkenyl ether type, mention may be made of those present in the following formulae:

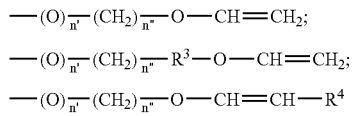

in which:
n' represents 0 or 1 and n" an integer between 1 and 5
$R^3$ represents:
an optionally substituted, linear, branched or cyclic, $C_1$–$C_{12}$ alkylene radical,
or a $C_5$–$C_{12}$ arylene radical, preferably a phenylene radical, which is optionally substituted, preferably by one to three $C_1$–$C_6$ alkyl groups,
$R^4$ represents a linear or branched $C_1$–$C_6$ alkyl radical.

As regards the functional groups Fa or Fb of dioxolane type, mention may be made of those present in the following formulae:

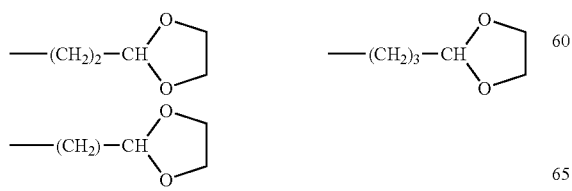

R10 The onium borate used in the context of the present invention is carefully chosen; this is because it has to be miscible with the silicone constituents (A) and (B) and therefore it has to be capable of dissolving well or dispersing well in the composition according to the invention. This onium borate is chosen from onium borates in which the onium is derived from an element from Groups 15 to 17 of the Periodic Table [Chem. & Eng. News, vol. 63, No. 5, 26, of Feb. 4, 1985], for which:
the cationic entity of the borate is selected from:
(1″) onium salts of formula (I):

  (I)

in which formula:
A represents an element from Groups 15 to 17, such as, for example: I, S, Se, P or N,
$R^1$ represents a $C_6$–$C_{20}$ carbocyclic or heterocyclic aryl radical, it being possible for said heterocyclic radical to comprise nitrogen or sulfur as heteroelements,
$R^2$ represents $R^1$ or a linear or branched $C_1$–$C_{30}$ alkyl or alkenyl radical; said $R^1$ and $R^2$ radicals optionally being substituted by a $C_1$–$C_{25}$ alkoxy, $C_1$–$C_{25}$ alkyl, nitro, chloro, bromo, cyano, carboxyl, ester or mercapto group,
n is an integer ranging from 1 to v+1, v being the valency of the element A,
m is an integer ranging from 0 to v−1, with n+m=v+1,
(2″) the oxoisothiochromanium salts disclosed in patent application WO 90/11303, in particular the 2-ethyl-4-oxoisothiochromanium or 2-dodecyl-4-oxoisothiochromanium sulfonium salt,
and the borate anionic entity has the formula $[BX'_a R^3_b]^-$ in which:
a and b are integers ranging, for a, from 0 to 3 and, for b, from 1 to 4, with a+b=4,
the symbols X' represent:
a halogen atom (chlorine, fluorine) with a=0 to 3,
an OH functional group with a=0 to 2,
the symbols $R^3$, which are identical or different, represent:,
a phenyl radical substituted by at least one electron-withdrawing group, such as, for example, $OCF_3$, $CF_3$, $NO_2$ or CN, and/or by at least 2 halogen atoms (very particularly fluorine), this being the case when the cationic entity is an onium of an element from Groups 15 to 17,
a phenyl radical substituted by at least one electron-withdrawing element or group, in particular a halogen atom (very particularly fluorine), $CF_3$, $OCF_3$, $NO_2$ or CN, this being the case when the cationic entity is an organometallic complex of an element from Groups 4 to 10,
an aryl radical comprising at least two aromatic nuclei, such as, for example, biphenyl or naphthyl, which is optionally substituted by at least one electron-withdrawing element or group, in particular a halogen atom (very particularly fluorine), $OCF_3$, $CF_3$, $NO_2$ or CN, whatever the cationic entity.

Without this being limiting, further information with regard to the onium borate subclasses which are more particularly preferred in the context of the use in accordance with the invention is given below.

According to a first preferred alternative form of the invention, the types of the borate anionic entity which are very particularly suitable are as follows:

1': $[B(C_6F_5)_4]^-$
2': $[(C_6F_5)_2BF_2]^-$
3': $[B(C_6H_4CF_3)_4]^-$
4': $[B(C_6F_4OCF_3)_4]^-$.
5': $[B(C_6H_3(CF_3)_2)_4]^-$
6': $[B(C_6H_3F_2)_4]^-$
7': $[C_6F_5BF_3]^-$

According to a second preferred alternative form of the invention, the onium salts (1) which can be used are disclosed in numerous documents, in particular in patents U.S. Pat. No. 4,026,705, U.S. Pat. No. 4,032,673, U.S. Pat. No. 4,069,056, U.S. Pat. No. 4,136,102 and U.S. Pat. No. 4,173,476. Among these, preference will very particularly be given to the following cations:

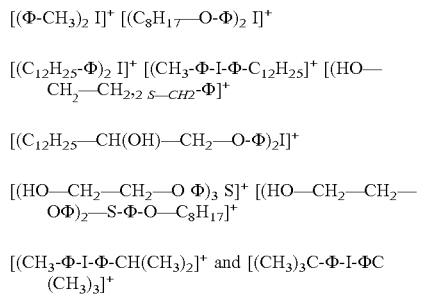

[(Φ-CH$_3$)$_2$ I]$^+$ [(C$_8$H$_{17}$—O-Φ)$_2$ I]$^+$

[(C$_{12}$H$_{25}$-Φ)$_2$ I]$^+$ [(CH$_3$-Φ-I-Φ-C$_{12}$H$_{25}$]$^+$ [(HO—CH$_2$—CH$_{2\cdot 2}$ $_{S—CH2}$-Φ]$^+$

[(C$_{12}$H$_{25}$—CH(OH)—CH$_2$—O-Φ)$_2$I]$^+$

[(HO—CH$_2$—CH$_2$—O Φ)$_3$ S]$^+$ [(HO—CH$_2$—CH$_2$—OΦ)$_2$—S-Φ-O—C$_8$H$_{17}$]$^+$

[(CH$_3$-Φ-I-Φ-CH(CH$_3$)$_2$]$^+$ and [(CH$_3$)$_3$C-Φ-I-ΦC(CH$_3$)$_3$]$^+$

In agreement with these two preferred alternative forms, mention may be made, as examples of photoinitiators of the onium borate type, of the following products:

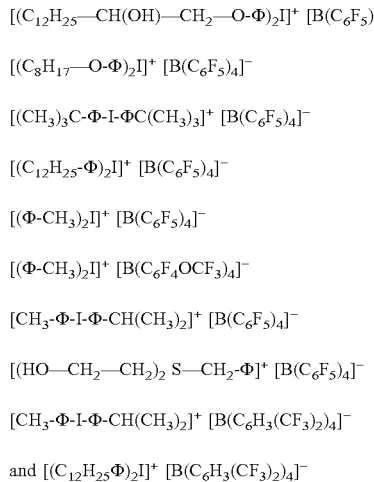

[(C$_{12}$H$_{25}$—CH(OH)—CH$_2$—O-Φ)$_2$I]$^+$ [B(C$_6$F$_5$)$_4$]$^-$

[(C$_8$H$_{17}$—O-Φ)$_2$I]$^+$ [B(C$_6$F$_5$)$_4$]$^-$

[(CH$_3$)$_3$C-Φ-I-ΦC(CH$_3$)$_3$]$^+$ [B(C$_6$F$_5$)$_4$]$^-$

[(C$_{12}$H$_{25}$-Φ)$_2$I]$^+$ [B(C$_6$F$_5$)$_4$]$^-$

[(Φ-CH$_3$)$_2$I]$^+$ [B(C$_6$F$_5$)$_4$]$^-$

[(Φ-CH$_3$)$_2$I]$^+$ [B(C$_6$F$_4$OCF$_3$)$_4$]$^-$

[CH$_3$-Φ-I-Φ-CH(CH$_3$)$_2$]$^+$ [B(C$_6$F$_5$)$_4$]$^-$

[(HO—CH$_2$—CH$_2$)$_2$ S—CH$_2$-Φ]$^+$ [B(C$_6$F$_5$)$_4$]$^-$

[CH$_3$-Φ-I-Φ-CH(CH$_3$)$_2$]$^+$ [B(C$_6$H$_3$(CF$_3$)$_2$)$_4$]$^-$ and [(C$_{12}$H$_{25}$Φ)$_2$I]$^+$ [B(C$_6$H$_3$(CF$_3$)$_2$)$_4$]$^-$ A second aspect of the present invention relates to a release silicone/adhesive complex comprising at least one silicone coating applied to a first support and an adhesive coating applied to a second support, characterized in that said silicone coating derives from a mixture of polyorganosiloxane(s) (A) and (B) in the presence of a miscible photoinitiator as defined above.

According to a first alternative form, the two supports are composed of two distinct materials, positioned so that the silicone coating of the first support is in contact with the adhesive coating of the second support. This embodiment is illustrated in particular by systems described as self-adhesive labels combined with a nonadhesive support. In this specific case, the disbandment force of the silicone/adhesive interface is exerted during the separation of the two supports.

In a second alternative form, the two supports are respectively either of the two faces of the same material. This second embodiment is illustrated in particular by systems referred to as adhesive tapes. The release coating, that is to say based on the silicone matrix, and the adhesive coating are brought into contact when the support is rolled up over itself. In this case, the disbandment force is exerted at the silicone/adhesive interface under the effect of the separation of a lower face from an upper face of the material.

As regards the adhesive coating, it can be highly varied in nature, provided that it is chemically compatible with the silicone coating.

In the context of the present invention, it can be chosen in particular from adhesives of acrylic, natural or synthetic gum and/or latex type.

Generally, the adhesive coatings deposited at the surface of a wide variety of materials so as to obtain labels, tapes or any other self-adhesive material derive from emulsions referred to as pressure-sensitive adhesive (PSA) emulsions. They confer on the material the ability to adhere to the surface of a support, without requiring any activation other than gentle pressing.

The monomers employed to prepare the PSAs are selected according to their glass transition temperature, Tg, in order to confer, on the polymers incorporating them, the expected behavior in terms of adhesion and viscoelasticity. To this end, the monomers advantageously have a glass transition temperature which is sufficiently low, generally between −70 and −10° C. and preferably is less than −30° C.

More specifically, these monomers are chosen from the group consisting
- of (meth)acrylic esters, such as esters of acrylic acid and of methacrylic acid with hydrogenated or fluorinated $C_1$–$C_{12}$, preferably $C_1$–$C_8$, alkanols, in particular methyl acrylate, ethyl acrylate, propyl acrylate, n-butyl acrylate, isobutyl acrylate, 2-ethylhexyl acrylate, tert-butyl acrylate, hexyl acrylate, heptyl acrylate, octyl acrylate, isooctyl acrylate, decyl acrylate, dodecyl acrylate, methyl methacrylate, ethyl methacrylate, n-butyl methacrylate or isobutyl methacrylate;
- of vinyl nitriles, including more particularly those having from 3 to 12 carbon atoms, such as, in particular, acrylonitrile and methacrylonitrile;
- of carboxylic acid vinyl esters, such as vinyl acetate, vinyl versatate or vinyl propionate,
- unsaturated ethylenic mono- and dicarboxylic acids, such as acrylic acid, methacrylic acid, itaconic acid, maleic acid or fumaric acid, and mono- and dialkyl esters of mono- and dicarboxylic acids of the type mentioned with alkanols preferably having 1 to 8 carbon atoms, and their N-substituted derivatives,
- amides of unsaturated carboxylic acids, such as acrylamide, methacrylamide, N-methylolacrylamide or N-methylolmethacrylamide, or N-alkylacrylamides,
- ethylenic monomers comprising a sulfonic acid group and its alkali metal or ammonium salts, for example vinylsulfonic acid, vinylbenzenesulfonic acid, α-acrylamidomethylpropanesulfonic acid or 2-sulfoethylene methacrylate,
- unsaturated ethylenic monomers comprising a secondary, tertiary or quaternary amino group or a nitrogen-comprising heterocyclic group, such as, for example, vinylpyridines, vinylimidazole, aminoalkyl (meth)acrylates and aminoalkyl(meth)acrylamides, such as dimethylaminoethyl acrylate or dimethylaminoethyl methacrylate, di(tert-butyl)aminoethyl acrylate or di(tert-butyl)aminoethyl methacrylate, or dimethylaminomethylacrylamide or dimethylaminomethylmethacrylamide, zwitterionic monomers, such as, for example, sulfopropyl (dimethyl)aminopropyl acrylate, ethylenic monomers carrying a sulfate group, ethylenic monomers carrying one or more phosphate and/or phosphonate functional group(s), and their mixtures.

Conventionally, the PSAs are obtained by polymerization predominantly of alkyl acrylate monomers, which are generally present in a proportion of 50 to approximately 99% and preferably in a proportion of 80 to 99% by weight, and of copolymerizable polar monomers, such as, for example, acrylic acid, in smaller proportions.

A third aspect of the present invention relates to the use of polyorganosiloxane of type B as described above for the stabilization of the disbandment forces of a silicone/adhesive complex as defined above by introduction of such a polyorganosiloxane of type B into the curable composition based on silicone of type A and on photoinitiator according to the invention.

In the context of the present invention, a disbandment force generally of less than 20 g/cm and more frequently a disbandment force of less than 10 g/cm is obtained.

In general, the force necessary to disbond the release silicone coating from the adhesive changes, at the end of the test of aging for 7 days at 70° C., which represents aging for 6 months, at most by a factor of less than 4 and more frequently of less than 2.

This disbandment force also does not change, and at most changes by a factor of less than 2, whatever the pressure exerted between the adhesive and the release silicone coating.

The following examples and tests are given by way of illustration. They make it possible in particular to achieve a better understanding of the invention and to reveal some of its advantages and to illustrate a few of its alternative embodiments.

Products Used

The photoinitiator used is in solution at 18% in isopropanol and corresponds to the formula:

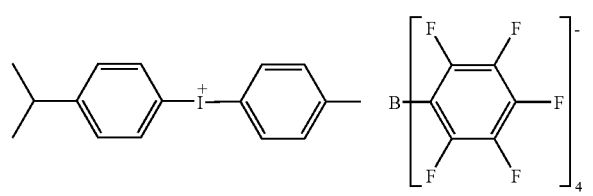

The silicone (A) used in combination with the silicone of type (B) has the average formula below, where a=80 and b=7:

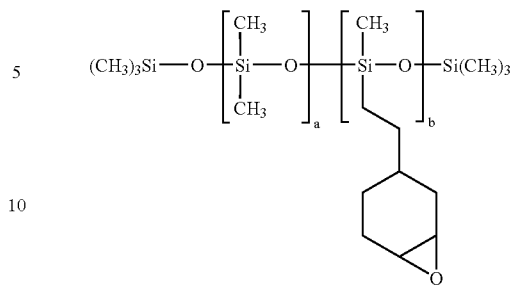

The silicone (B) has the average formula below, where a=180:

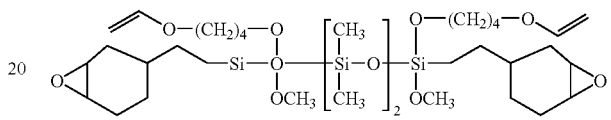

EXAMPLES 1 TO 4

Preparation of the Photocrosslinkable Compositions

The compositions are prepared from a mixture of 100 parts by weight of a mixture of polymers (A) (300 cPs) and (B) (1 200 cPs), to which are added 2.5 parts by weight of an 18% solution of the photoinitiator in isopropanol.

| Examples | Polymer (A) parts | Polymer (B) parts | Photoinitiator parts |
|---|---|---|---|
| 1 (reference) | 100 | 0 | 2.5 |
| 2 | 90 | 10 | 2.5 |
| 3 | 66 | 33 | 2.5 |
| 4 | 33 | 66 | 2.5 |

Tests

A. Release Silicone Coatings Obtained from Compositions 1 to 4

These compositions are photopolymerized after application to a polyester film of Mylar® type.

Each composition is applied using a manual coating machine (Euclide Tool and Machine); the deposition carried out is of the order of 1 g/m².

The composition applied is subsequently exposed under UV irradiation at a rate of forward progression of 100 m/min and in the presence of a mercury vapor arc lamp with a power of 120 W/cm (IST).

B. Release Silicone Coating/Adhesive Complex

Each release silicone coating is subsequently brought into contact with an adhesive tape of Beiersdorf Tesa® 4970 type and is then tested according to the procedures described below.

C. Procedures

The disbandment forces of the various coating/adhesive complexes obtained are measured:
(i) initially,
(ii) after storing for 20 h at 20° C. according to the Finat 3 standardized test under a force of 70 g/cm with a disbandment rate of 300 mm/min, (iii) after 1 day at 70° C., simulating aging for 1 to 3 months at 20° C., under pressure conditions of 70 g/cm (Finat 10),
(iv) and after simulating aging for 6 months of the coating/adhesive complexes for 7 days at 70° C.

D. Results

| Coating/adhesive complex resulting from examples | Initial value g/m | Finat 3* g/cm | Finat 10* g/cm | 7 days at 70° C.* g/cm |
|---|---|---|---|---|
| 1 (reference) | 8 | 12.7 | 21 | 33.8 |
| 2 | 6.5 | 11 | 15.6 | 19.7 |
| 3 | 5 | 7.9 | 11 | 15.6 |
| 4 | 4.5 | 5.6 | 8.3 | 13.8 |

The invention claimed is:

1. An irradiation-curable silicone-based coating composition, consisting essentially of
   (a) at least one liquid polyorganosiloxane A having a viscosity of approximately 10 to 10 000 mPa·s at 25° C. and carrying a crosslinkable and/or polymerizable functional group Fa being an epoxy, alkenyl ether, oxetane or dioxolane functional group on at least one M and/or T unit and/or at least one crosslinkable and/or polymerizable functional group Fa on at least one D unit,
   (b) at least one liquid linear polyorganosiloxane B having a viscosity of approximately 10 to 10 000 mPa·s at 25° C. and carrying 2 crosslinkable and/or polymerizable functional groups Fb being an epoxy, alkenyl ether, oxetane or dioxolane functional group on at least one M unit, said polyorganosiloxane B being composed of units of formula (III) and terminated by units of formula (IV), of formulae:

wherein:
(1') the symbols R, which are identical or different, represent:
   (i) a linear or branched alkyl radical comprising 1 to 8 carbon atoms optionally substituted by at least one halogen,
   (ii) an optionally substituted cycloalkyl radical comprising between 5 and 8 cyclic carbon atoms,
   (iii) an aryl radical comprising between 6 and 12 carbon atoms, optionally substituted,
   (iv) an aralkyl part having an alkyl part comprising between 5 and 14 carbon atoms and an aryl part comprising between 6 and 12 carbon atoms, optionally substituted on the aryl part by halogens, alkyls or alkoxyls comprising 1 to 3 carbon atoms,
   (v) a hydroxyl group OH or an alkoxyl group comprising from 1 to 8 carbon atoms, and
   (vi) a hydrogen radical,
(2') the symbols Y are identical or different and represent:
   (i) a group R,
   (ii) a crosslinkable or polymerizable organofunctional group Go being an epoxy, alkenyl ether, oxetane or dioxolane functional group, connected to the silicon of the polyorganosiloxane via a divalent radical which comprises from 2 to 20 carbon atoms and optionally having at least one heteroatom, and
   (iii) with at least one of the symbols Fb in one of the units (IV), and
(c) an effective amount of a cationic photoinitiator composed of at least one onium borate.

2. The composition as claimed in claim 1, wherein the polyorganosiloxane A comprises at least one crosslinkable and/or polymerizable functional group Fa on the units D and/or T.

3. The composition as claimed in claim 1, wherein the polyorganosiloxane A is linear and composed of units of formula (I) and terminated by units of formula (II) or is cyclic and composed of units of formula (I), which formulae are represented below:

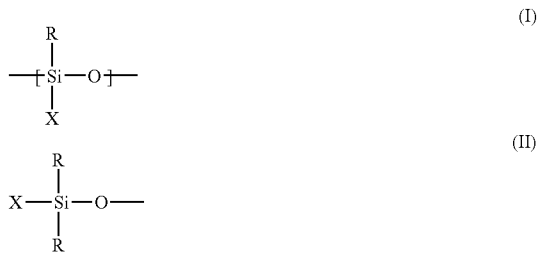

wherein:
(1) the symbols R, which are identical or different, represent:
   (i) a linear or branched alkyl radical comprising 1 to 8 carbon atoms, optionally substituted by at least one halogen,
   (ii) an optionally substituted cycloalkyl radical comprising between 5 and 8 cyclic carbon atoms,
   (iii) an aryl radical comprising between 6 and 12 carbon atoms optionally substituted,
   (iv) an aralkyl part having an alkyl part comprising between 5 and 14 carbon atoms and an aryl part comprising between 6 and 12 carbon atoms, optionally substituted on the aryl part by halogens, alkyls or alkoxyls comprising 1 to 3 carbon atoms,
   (v) a hydroxyl group OH or an alkoxyl group comprising from 1 to 8 carbon atoms, and
   (vi) a hydrogen radical,
(2) the symbols X are identical or different and represent:
   (i) a group R,
   (ii) a crosslinkable and/or polymerizable organofunctional group Fa, connected to the silicon of the polyorganosiloxane via a divalent radical having from 2 to 20 carbon atoms, optionally presenting at least one heteroatom, and
   (iii) with at least one of the symbols Fa in one of the units (I).

4. The composition as claimed in claim 3, wherein
(1) the symbols R, which are identical or different, represent:
   (i) methyl, ethyl, propyl, octyl or 3,3,3-trifluoropropyl, and
   (iii) phenyl or dichlorophenyl, (2) the symbols X are identical or different and represent:
  (ii) an epoxy functional, oxetane functional, dioxolane functional or alkenyl ether functional group, connected to the silicon of the polyorganosiloxane via a divalent radical, optionally comprising at least one oxygen heteroatom, and
  (iii) with at least one of the symbols Fa in one of the units (I).

5. The composition as claimed in claim 1, wherein
(1') the symbols R, which are identical or different, represent:
  (i) methyl, ethyl, propyl, octyl or 3,3,3-trifluoropropyl,
  (iii) a phenyl or dichlorophenyl,
(2') the symbols Y are alike or different and represent:
  (i) a group R,
  (ii) an epoxy functional, oxetane functional, dioxolane functional or alkenyl ether functional group, connected to the silicon of the polyorganosiloxane via a divalent radical optionally comprising at least one oxygen heteroatom,
  (iii) with at least two symbols Fb in one of the units (IV).

6. The composition as claimed in claim 1, wherein the polyorganosiloxane B carries 2 units M with at least two functional groups Fb.

7. The composition as claimed in claim 5, wherein the polyorganosiloxane B additionally carries at least one group Fb on at least one unit D.

8. The composition as claimed in claim 1, wherein the onium borate is derived from the borates of an element from Groups 15 to 17 of the Periodic Table or borates of an organometallic complex of an element from Groups 4 to 10 of the Periodic Table, and wherein:
  the cationic entity of the borate is:
  (1") an onium salt of formula (I):

   (I)

wherein:
  A represents an element from Groups 15 to 17,
  $R^1$ represents a $C_6$–$C_{20}$ carbocyclic or heterocyclic aryl radical comprising nitrogen or sulfur as heteroelements,
  $R^2$ represents $R^1$ or a linear or branched $C_1$–$C_{30}$ alkyl or alkenyl radical; said $R^1$ and $R^2$ radicals optionally being substituted by a $C_1$–$C_{25}$ alkoxy, $C_1$–$C_{25}$ alkyl, nitro, chloro, bromo, cyano, carboxyl, ester or mercapto group,
  n is an integer ranging from 1 to v+1, v being the valency of the element A, and
  m is an integer ranging from 0 to v−1, with n+m=v +1,
  (2") an oxoisothiochromanium salt, and
  the borate anionic entity has the formula $[BX'_aR_b]^-$ wherein:
    a and b are integers ranging, for a, from 0 to 3 and, for b, from 1 to 4, with a+b=4,
    the symbols X' represent:
      a halogen atom with a=0 to 3,
      an OH functional group with a=0 to 2,
    the symbols $R^3$ are identical or different and represent:
      a phenyl radical substituted by at least one electron-withdrawing groupor by at least 2 halogen atoms, this being the case when the cationic entity is an onium of an element from Groups 15 to 17,
      a phenyl radical substituted by at least one electron-withdrawing element or group, this being the case when the cationic entity is an organometallic complex of an element from Groups 4 to 10,
      an aryl radical comprising at least two aromatic nuclei, which is optionally substituted by at least one electron-withdrawing element, whatever the cationic entity.

9. The composition as claimed in claim 8, wherein wherein the oxoisothiochromanium salt is 2-ethyl-4-oxoisothiochromanium or 2-dodecyl-4-oxoisothiochromanium sulfonium salt.

10. A release coating capable of being obtained by crosslinking or polymerization of the composition as defined in claim 1.

11. A release silicone/adhesive complex comprising at least one silicone coating applied to a first support and an adhesive coating applied to a second support, wherein said silicone coating derives from the composition as defined in claim 1.

* * * * *